(12) United States Patent
Boul et al.

(10) Patent No.: US 12,534,995 B2
(45) Date of Patent: Jan. 27, 2026

(54) METHODS OF DETERMINING WELLBORE INTEGRITY

(71) Applicant: Saudi Arabian Oil Company, Dhahran (SA)

(72) Inventors: Peter J. Boul, Houston, TX (US); Ashok Santra, The Woodlands, TX (US)

(73) Assignee: Saudi Arabian Oil Company, Dhahran (SA)

(*) Notice: Subject to any disclaimer, the term of this patent is extended or adjusted under 35 U.S.C. 154(b) by 398 days.

(21) Appl. No.: 18/351,042

(22) Filed: Jul. 12, 2023

(65) Prior Publication Data

US 2023/0358132 A1 Nov. 9, 2023

Related U.S. Application Data

(62) Division of application No. 16/934,602, filed on Jul. 21, 2020, now Pat. No. 11,739,628.

(60) Provisional application No. 62/877,036, filed on Jul. 22, 2019.

(51) Int. Cl.
| | |
|---|---|
| *E21B 47/005* | (2012.01) |
| *C09K 8/467* | (2006.01) |
| *E21B 33/14* | (2006.01) |
| *E21B 47/13* | (2012.01) |

(52) U.S. Cl.
CPC ............ *E21B 47/005* (2020.05); *C09K 8/467* (2013.01); *E21B 33/14* (2013.01); *E21B 47/13* (2020.05); *C09K 2208/08* (2013.01); *C09K 2208/10* (2013.01)

(58) Field of Classification Search
CPC ........ E21B 47/005; E21B 47/13; E21B 33/14; C09K 8/467; C09K 2208/08; C09K 2208/10
See application file for complete search history.

(56) References Cited

U.S. PATENT DOCUMENTS

| | | | |
|---|---|---|---|
| 6,515,592 B1 * | 2/2003 | Babour | E21B 47/12 340/854.6 |
| 6,978,832 B2 | 12/2005 | Gardner et al. | |
| 8,469,118 B2 | 6/2013 | Passade-Boupat et al. | |
| 8,763,695 B2 | 7/2014 | van Zanten | |
| 8,822,386 B2 | 9/2014 | Quintero et al. | |
| 8,835,363 B2 | 9/2014 | Amanullah et al. | |
| 9,840,906 B2 * | 12/2017 | Scheibelmasser | E21B 17/023 |
| 11,739,628 B2 * | 8/2023 | Boul | E21B 47/01 166/250.14 |
| 2008/0158005 A1 * | 7/2008 | Santoso | E21B 47/12 340/854.4 |

(Continued)

OTHER PUBLICATIONS

Chinese office action with English translation, dated Mar. 27, 2024 received in corresponding Chinese Patent Application No. 202080053322.6, pp. 1-10.

*Primary Examiner* — Jill E Culler
(74) *Attorney, Agent, or Firm* — Dinsmore & Shohl LLP

(57) ABSTRACT

Methods of determining the integrity of a well are provided. The methods include mixing conductive materials into a fluid, introducing the fluid into the well, and allowing the conductive materials to coat a surface of a subsurface formation, thereby forming an electrically conductive data conduit coating. The methods further include transmitting data through the electrically conductive data conduit coating to determine the integrity of the well.

18 Claims, 2 Drawing Sheets

(56) References Cited

U.S. PATENT DOCUMENTS

2011/0111988 A1    5/2011   Ionescu Vasii et al.
2016/0258269 A1    9/2016   Musso et al.

* cited by examiner

METHODS OF DETERMINING WELLBORE INTEGRITY

CROSS-REFERENCE TO RELATED APPLICATION

The application claims priority to U.S. Non-Provisional application Ser. No. 16/934,602, filed Jul. 21, 2020, which claims priority to Provisional Application No. 62/877,036, filed Jun. 22, 2019, the entire disclosure of which is hereby incorporated herein by reference.

TECHNICAL FIELD

Embodiments of the present disclosure generally relate to methods of determining the integrity of a well.

BACKGROUND

Cement slurries are used in the oil and gas industries such as for cementing in oil and gas wells. Primary, remedial, squeeze, and plug cementing techniques can be used, for instance, to place cement sheaths in an annulus between wellbore casing and subsurface formations, for well repairs, well stability, and for well abandonment (sealing an old well to eliminate safety hazards). These cement slurries must be able to consistently perform over a wide range of temperatures and conditions, as cement set in an oil and gas well may be vulnerable to cyclic stresses imposed by pressure and temperature fluctuations. However, cement may crack and break over time in downhole conditions, which reduces the integrity of the wellbore and may lead to unwanted fluid communication between the wellbore and subsurface formations.

SUMMARY

Monitoring wellbore integrity determines the elasticity, strength, and performance properties of the cured cement composition over time. However, conventional tools to determine wellbore integrity, such as logs, may only be performed periodically and require complete shutdown of the well. Furthermore, the use of conventional electrical connections to connect these sensors to the surface, such as a continuous fiber optic cable, provides a potential fluid communication pathway between subsurface formations. The use of such conventional electrical connections interrupts the continuity of the cement sheath and may contribute to cracks or fractures in the cement. Accordingly, there is an ongoing need for methods of determining the integrity of a well that may be performed during production operations without requiring well shutdown. The present embodiments address these needs by providing methods of determining the integrity of a well using an electrically conductive data conduit coating.

In one embodiment, a method of determining integrity of a well is provided including mixing conductive materials into a fluid, introducing the fluid into the well, and allowing the conductive materials to coat a surface of a subsurface formation, thereby forming an electrically conductive data conduit coating. The method further includes transmitting data through the electrically conductive data conduit coating to determine the integrity of the well.

In another embodiment, a method of determining integrity of a well is provided including mixing insulating materials into a drilling fluid, mixing conductive materials into a spacer fluid, introducing the drilling fluid into the well, and allowing the insulating materials to coat a surface of a subsurface formation, thereby forming an electrically insulating layer. The method further includes introducing the spacer fluid into the well, allowing the conductive materials to coat the electrically insulating layer, thereby forming an electrically conductive data conduit coating, and transmitting data through the electrically conductive data conduit coating to determine the integrity of the well.

This disclosure also discloses a wellbore integrity monitoring configuration having an electrically conductive data conduit coating disposed between a wellbore casing and a subsurface formation, a plurality of wellbore sensors, and a surface interrogator in communication with the wellbore sensors via the electrically conductive data conduit coating. The electrically conductive data conduit coating provides a medium for data transmission from the wellbore sensors to the surface interrogator. The wellbore sensors are disposed in the subsurface formation, the electrically conductive data conduit coating or in an intervening layer disposed between the electrically conductive data conduit coating and the wellbore casing. The wellbore sensors are operable to measure a condition that is indicative of the integrity of the wellbore and to generate sensory data representing the wellbore condition. The surface interrogator, the wellbore sensors, and the electrically conductive data conduit coating are collectively configured for the transfer of sensory data from the wellbore sensors to the surface interrogator via the electrically conductive data conduit coating to facilitate monitoring of the integrity of the wellbore based on sensory data received from the wellbore sensors.

According to an embodiment of the wellbore integrity monitoring configuration, the wellbore sensors are disposed in the electrically conductive data conduit coating. In other embodiments, the wellbore sensors are disposed in the subsurface formation. The intervening layer may have a cement layer disposed between the wellbore casing and the electrically conductive data conduit coating. In some embodiments, the wellbore sensors are disposed in the cement layer. The intervening layer may have an electrically insulating layer disposed between the wellbore casing and the electrically conductive data conduit coating. The wellbore sensors may be disposed in the electrically insulating layer. In other embodiments, the wellbore sensors are disposed in at least two of the electrically conductive data conduit coating, the subsurface formation, and the intervening layer. The intervening layer may have a cement layer and an electrically insulating layer disposed between the wellbore casing and the electrically conductive data conduit coating. In some embodiments, the intervening layer has a cement layer and an electrically insulating layer, and the wellbore sensors are disposed in at least two of the electrically conductive data conduit coating, the subsurface formation, the cement layer, and the electrically insulating layer.

Additional features and advantages of the described embodiments will be set forth in the detailed description which follows, and in part will be readily apparent to those skilled in the art from that description or recognized by practicing the described embodiments, including the detailed description which follows as well as the claims.

BRIEF DESCRIPTION OF THE DRAWINGS

The following detailed description of specific embodiments of the present disclosure can be best understood when read in conjunction with the following drawing, where like structure is indicated with like reference numerals and in which.

DETAILED DESCRIPTION

As used throughout this disclosure, the term "cement slurry" refers to a composition including a cement precursor that is mixed with at least water to form cement. The cement slurry may contain calcined alumina ($Al_2O_3$), silica ($SiO_2$), calcium oxide (CaO, also known as lime), iron oxide (FeO), magnesium oxide (MgO), clay, sand, gravel, and mixtures of these.

As used throughout this disclosure, the term "chemisorption" refers to chemical adsorption in which the adsorbed substance is held by chemical bonds.

As used throughout this disclosure, the term "conductive fibers" refers to any substrate with an aspect ratio of greater than 1 that is capable of conducting electrical current.

As used throughout this disclosure, the term "hydrostatic pressure" refers to the pressure exerted per unit area by a column of fluid.

As used throughout this disclosure, the term "physisorption" refers to physical adsorption in which the electronic structure of atom or molecule is unaffected.

As used throughout this disclosure, the term "retarder" refers to a chemical agent used to increase the thickening time of cement slurries to enable proper placement of the cement slurry within the wellbore. The need for cement retardation increases with depth due to the greater time required to complete the cementing operation and the effect of increased temperature on the cement-setting process.

As used throughout this disclosure, the term "spacer fluid" is any fluid that may be used to separate one fluid from another, such that the two different fluids do not interact with each other, change each other's composition, or contaminate each other.

As used throughout this disclosure, the term "subsurface formation" refers to a body of rock that is sufficiently distinctive and continuous from the surrounding rock bodies that the body of rock can be mapped as a distinct entity. A subsurface formation is, therefore, sufficiently homogenous to form a single identifiable unit containing similar rheological properties throughout the subsurface formation, including, but not limited to, porosity and permeability. A subsurface formation is the fundamental unit of lithostratigraphy.

As used throughout this disclosure, the term "wellbore" refers to the drilled hole or borehole, including the openhole or uncased portion of the well. Borehole may refer to the inside diameter of the wellbore wall, the rock face that bounds the drilled hole.

Embodiments of the present disclosure relate to cement slurries with improved elasticity and self-healing capabilities. Embodiments of the present disclosure also relate to methods of producing and using cement slurries, in some particular embodiments, for use in the oil and gas industries.

Figure 1:
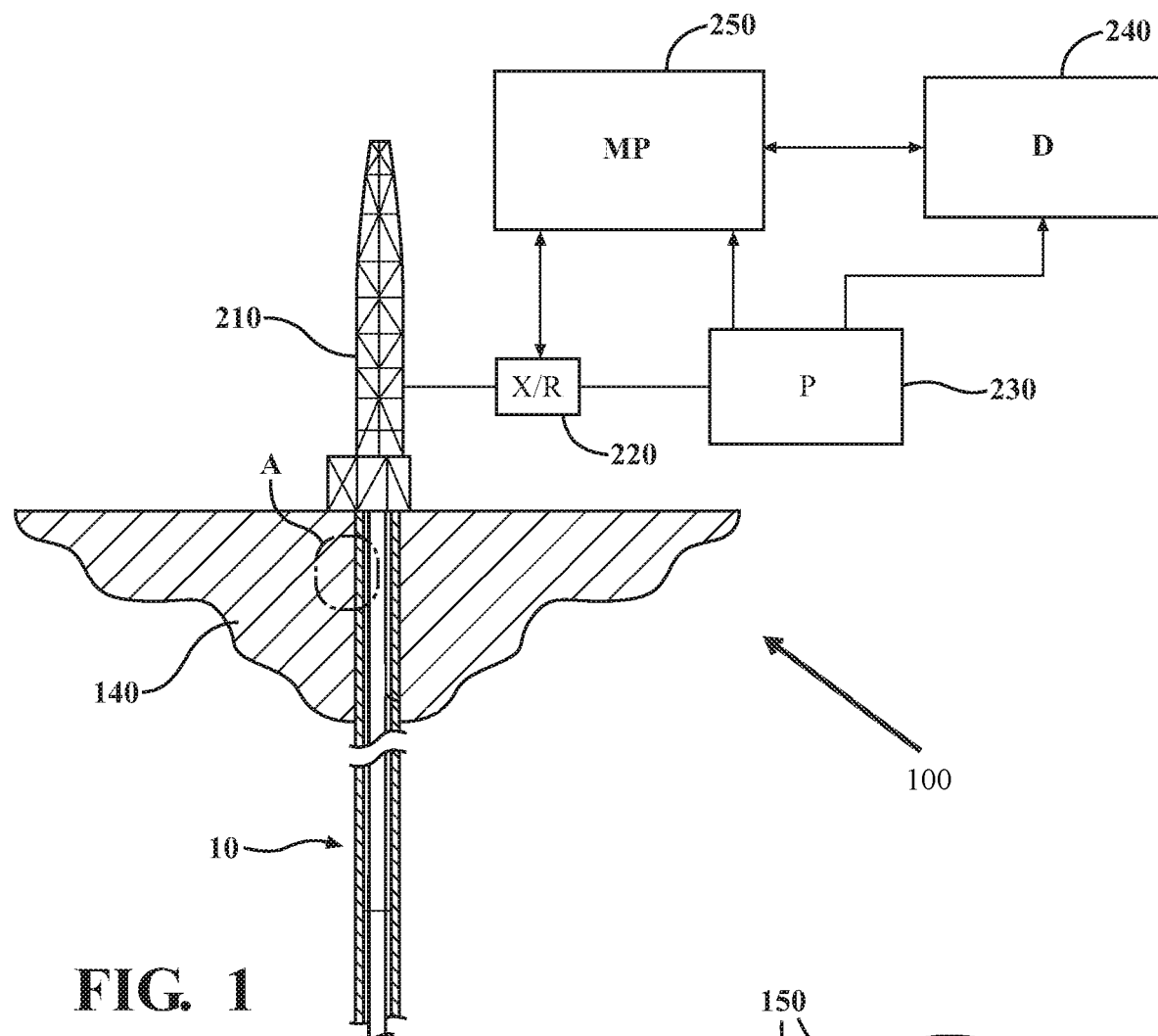
FIG. 1 is a schematic view of an oil and gas platform, according to one or more embodiments described in this disclosure.
Figure 2:
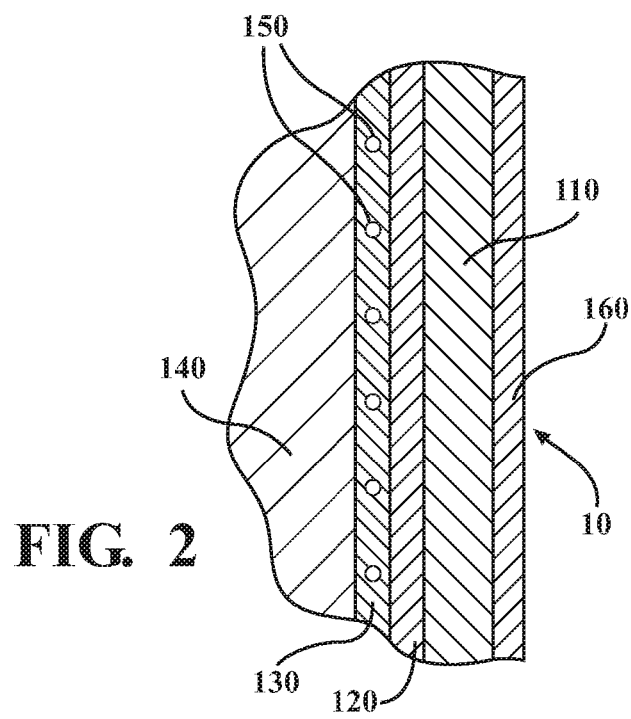
FIG. 2 is a schematic view from the side of a wellbore, according to one or more embodiments described in this disclosure.
Figure 3:
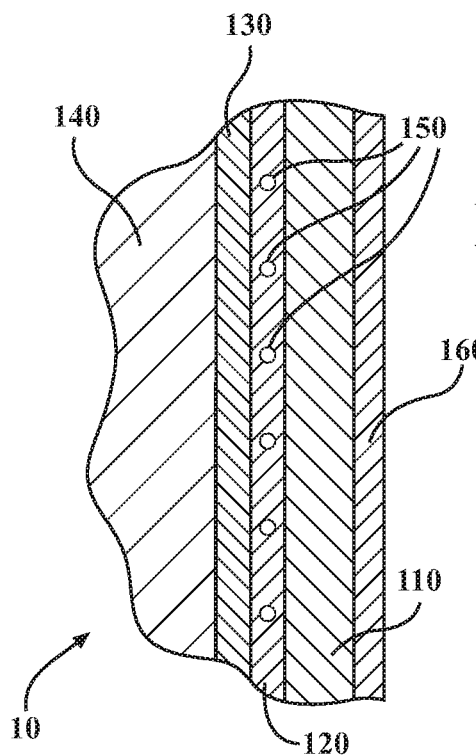
FIG. 3 is a schematic view from the side of a wellbore, according to one or more embodiments described in this disclosure.

Referring to FIGS. 1 and 2, an oil and gas platform 210 may be positioned over a wellbore 10 formed in a subsurface formation 140. The wellbore 10 may serve to connect natural resources, such as petrochemical products, to a ground level surface platform 210. A wellbore casing 160 may be inserted into the wellbore 10. The wellbore casing 160 may be a pipe or other tubular structure which has a diameter less than that of the wellbore 10. Generally, the wellbore casing may be lowered into the wellbore 10 such that the bottom of the wellbore casing 160 reaches to a region near the bottom of the wellbore 10.

Figure 4:
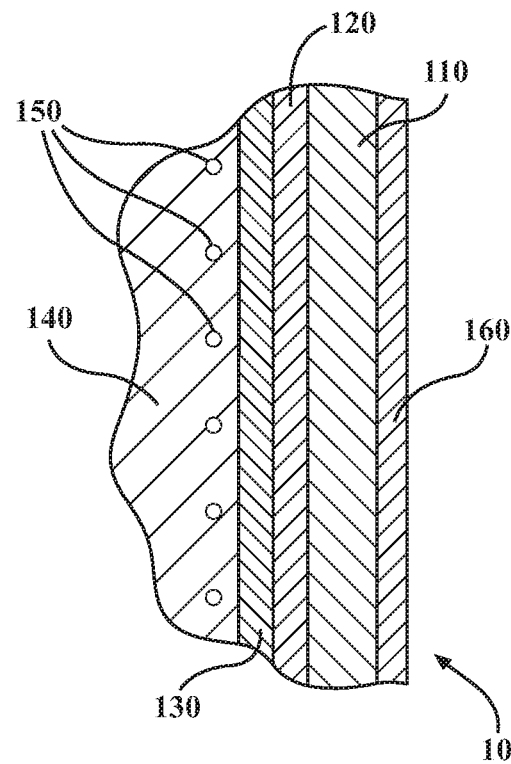
FIG. 4 is a schematic view from the side of a wellbore, according to one or more embodiments described in this disclosure.
Figure 5:
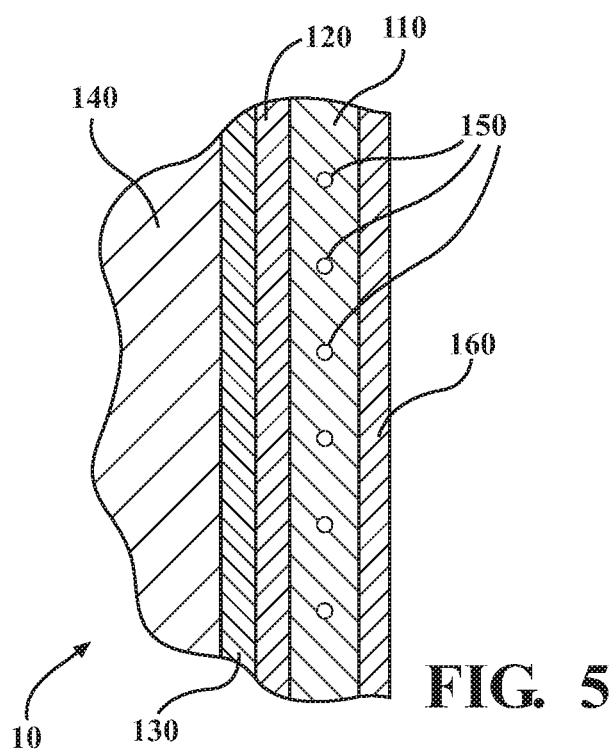
FIG. 5 is a schematic view from the side of a wellbore, according to one or more embodiments described in this disclosure.

FIGS. 2 and 5 illustrate detailed alternative embodiments of the wellbore 10 at inset A shown in FIG. 1. In a non-limiting example, the wellbore casing 160 shown in FIGS. 2-5 may be cemented by inserting a cement slurry into the annular region between the outer edge of the wellbore casing 160 and the edge of the wellbore 10 formed in the subsurface formation 140. This cement slurry will form a cement layer 110. The cement slurry may be inserted into the annular region by pumping the cement slurry into the interior portion of the wellbore casing 160, to the bottom of the wellbore casing 160, around the bottom of the wellbore casing 160, into the annular region, or a combination of some or all of these. The cement slurry may displace the drilling fluid, pushing it to the top of the well. In some embodiments, a spacer fluid may be used as a buffer between the cement slurry and the drilling fluid by displacing and removing the drilling fluid before the cement slurry is pumped into the well to prevent contact between the drilling fluid and the cement slurry. Following the insertion of an appropriate amount of cement slurry into the interior region of the wellbore casing, in some embodiments, a displacement fluid may be utilized to push the cement slurry out of the interior region of the wellbore casing 160 and into the annular region. This displacement may cause the entirety of the spacer fluid and drilling fluid to be removed from the annular region, out the top of the wellbore.

The cement slurry may then be cured or otherwise allowed to harden to form the cement layer 110. The cement layer 110 thus formed is disposed between the wellbore casing 160 and the subsurface formation 140. The cement layer 110 isolates the wellbore casing 160 from the subsurface formation 140. An electrically conductive data conduit coating 130 is disposed between the cement layer 110 and the subsurface formation 140. The process of coating the subsurface formation 140 with the electrically conductive data conduit coating 130 is discussed in detail subsequently. In some embodiments, an electrically insulating layer 120 is disposed between the cement layer 110 and the electrically conductive data conduit coating 130. In contrast to FIGS. 2-5, the electrically insulating layer in other embodiments (not shown) of this disclosure is disposed between the subsurface formation and the electrically conductive data conduit coating. In these embodiments, the cement layer is disposed on the conductive layer. The cement layer in these embodiments is thus sandwiched between the wellbore casing and the electrically conductive data conduit coating. In some embodiments, an intervening layer is disposed between the electrically conductive data conduit coating and the wellbore casing 160. The intervening layer may comprise the cement layer 110, the electrically insulating layer 120 or both.

A plurality of wellbore sensors 150 are disposed in the subsurface formation 140, electrically conductive data conduit coating 130, electrically insulating layer 120, cement layer 110 or combinations thereof. In other words, the wellbore sensors 150 may be disposed in one or more than one of these coatings or layers. The wellbore sensors 150 measure a condition indicative of the integrity of the wellbore 10 and generate sensory data representing the condition of wellbore 10. Further details about the type and operation of the wellbore sensors 150 is provided subsequently. The wellbore sensors 150 are interchangeably noted as wellbore sensors 150 in this disclosure. The electrically conductive data conduit coating 130 provides a medium for data transmission from the wellbore sensors 150 to a surface interrogator. The surface interrogator and its components are discussed in detail subsequently. The surface interrogator is in communication with the wellbore sensors 150 via the electrically conductive data conduit coating 130. The surface interrogator, the wellbore sensors 150, and the electrically conductive data conduit coating 130 are collectively configured for the transfer of sensory data from the wellbore sensors 150 to the surface interrogator via the electrically conductive data conduit coating 130 to facilitate monitoring of the integrity of the wellbore 10 based on sensory data received from the wellbore sensors 150.

To ensure the stability and safety of a well, it is important that the cement layer 110 maintains integrity and isolates the wellbore 10 from the surrounding subsurface formation 140. If the cement layer 110 cracks or degrades under cyclic stresses, wellbore integrity and isolation may be lost, resulting in undesirable fluid communication between the wellbore 10 and surrounding subsurface formations. Not intending to be limited by theory, this fluid communication may result in drilling fluid loss from the wellbore 10 into the surrounding subsurface formation 140, or in decreased wellbore pressure, possibly leading to a well control event. Therefore, wellbore integrity and isolation are critical to efficient production and use of a wellbore 10.

The present disclosure provides a method of determining integrity of a well is provided including mixing conductive materials into a fluid, introducing the fluid into the wellbore 10, and allowing the conductive materials to coat a surface of a subsurface formation 140, thereby forming an electrically conductive data conduit coating. The method further includes transmitting data through the electrically conductive data conduit coating to determine the integrity of the wellbore 10.

The fluid may include conductive fibers. These conductive fibers may include any substrate with an aspect ratio of greater than 1 that is capable of conducting electrical current. Specifically, the conductive fibers may include carbon nanotubes. The conductive fibers include electrically conductive elements. These electrically conductive elements may include at least one of carbon, nickel, copper, gold, silver, graphene, carbon nanofibers, carbon nanosheets, or titanium. The graphene may be provided in any desirable form or combination of forms, for example, nanosheets, nanoplatelets, nanofibers, nanotubes, chemically-modified graphene, doped graphene, functionalized graphene, warped nanographene, or combinations of these. These conductive fibers may form a conductive web within the electrically conductive data conduit coating.

The carbon nanotubes may be randomly dispersed throughout the fluid. The carbon nanotubes may be dispersed through a variety of methods, including, but not limited to, sonication, the exchange of superacids with surfactant, or sacrificial templating. Dispersing the carbon nanotubes via sonication may include agitating the carbon nanotubes in an aqueous phase with a dispersing agent. The dispersing agent may be any of the dispersing agents previously described. Dispersing the carbon nanotubes via sacrificial templating may include adding particles including carbon nanotubes disposed on sacrificial templates to a cement slurry and allowing the sacrificial templates to disintegrate, thereby leaving the carbon nanotubes dispersed throughout the cement slurry.

The carbon nanotubes include at least one of single-walled nanotubes, double-walled nanotubes, multi-walled nanotubes, narrow-walled nanotubes, or bundle of nanotubes. The carbon nanotubes may have a diameter of from 1 to 200 nanometers (nm), from 20 to 100 nm, from 10 to 80 nm, from 4 to 20 nm, from 2 to 12 nm, from 2 to 10 nm, from 2 to 9 nm, from 2 to 8 nm, from 2 to 7 nm, from 2 to 6 nm, from 2 to 5 nm, from 2 to 4 nm, from 2 to 3 nm, 3 to 12 nm, from 3 to 10 nm, from 3 to 9 nm, from 3 to 8 nm, from 3 to 7 nm, from 3 to 6 nm, from 3 to 5 nm, from 3 to 4 nm, 4 to 12 nm, from 4 to 10 nm, from 4 to 9 nm, from 4 to 8 nm, from 4 to 7 nm, from 4 to 6 nm, from 4 to 5 nm, 5 to 12 nm, from 5 to 10 nm, from 5 to 9 nm, from 5 to 8 nm, from 5 to 7 nm, from 5 to 6 nm, 6 to 12 nm, from 6 to 10 nm, from 6 to 9 nm, from 6 to 8 nm, from 6 to 7 nm, 7 to 12 nm, from 7 to 10 nm, from 7 to 9 nm, from 7 to 8 nm, 8 to 12 nm, from 8 to 10 nm, from 8 to 9 nm, 9 to 12 nm, from 9 to 10 nm, from 10 to 12 nm, or of 8 nm.

The carbon nanotubes may have a length of from 20 to 500 microns (μm), 20 to 200 μm, 20 to 150 μm, 20 to 100 μm, 50 to 500 μm, from 50 to 200 μm, from 50 to 150 μm, from 50 to 100 μm, from 100 to 500 μm, from 100 to 200 μm, from 100 to 150 μm, from 150 to 500 μm, from 150 to 200 μm, or from 200 to 500 μm.

An aspect ratio is the length of a substrate divided by the width or diameter. The carbon nanotubes may have an aspect ratio of length to width of from 100 to 50,000, from 500 to 30,000, from 1,000 to 20,000, from 1,000 to 100,000, from 1,000 to 50,000, from 1,000 to 40,000, from 1,000 to 30,000, from 1,000 to 25,000, from 1,000 to 20,000, from 1,000 to 15,000, from 1,000 to 12,000, from 1,000 to 10,000, from 1,000 to 8,000, from 8,000 to 100,000, from 8,000 to 50,000, from 8,000 to 40,000, from 8,000 to 30,000, from 8,000 to 25,000, from 8,000 to 20,000, from 8,000 to 15,000, from 8,000 to 12,000, from 8,000 to 10,000, from 10,000 to 100,000, from 10,000 to 50,000, from 10,000 to 40,000, from 10,000 to 30,000, from 10,000 to 25,000, from 10,000 to 20,000, from 10,000 to 15,000, from 10,000 to 12,000, from 12,000 to 100,000, from 12,000 to 50,000, from 12,000 to 40,000, from 12,000 to 30,000, from 12,000 to 25,000, from 12,000 to 20,000, from 12,000 to 15,000, from 15,000 to 100,000, from 15,000 to 50,000, from 15,000 to 40,000, from 15,000 to 30,000, from 15,000 to 25,000, from 15,000 to 20,000, from 20,000 to 100,000, from 20,000 to 50,000, from 20,000 to 40,000, from 20,000 to 30,000, from 20,000 to 25,000, from 25,000 to 100,000, from 25,000 to 50,000, from 25,000 to 40,000, from 25,000 to 30,000, from 30,000 to 100,000, from 30,000 to 50,000, from 30,000 to 40,000, from 40,000 to 50,000, from 40,000 to 100,000, or from 50,000 to 100,000.

The carbon nanotubes may have a specific surface area of from 100 to 12,000 square meter per gram ($m^2/g$), from 100 to 10,000 $m^2/g$, from 100 to 800 $m^2/g$, from 100 to 700 $m^2/g$, from 400 to 12,000 $m^2/g$, from 400 to 10,000 $m^2/g$, from 400 to 800 $m^2/g$, from 100 to 1,500 $m^2/g$, from 120 to 1,000 $m^2/g$, from 150 to 850 $m^2/g$, or from 400 to 700 $m^2/g$, where the specific surface area is calculated through the Brunauer-Emmett-Teller (BET) theory.

The multi-walled carbon nanotubes may include a metal oxide percentage of 10 weight percent (wt. %) or less, 5 wt. % or less, 3 wt. % or less, 2 wt. % or less, 1.5 wt. % or less, 1 wt. % or less, or 0.5 wt. % or less; and a bulk density of from 0.001 to 0.12 $g/cm^3$, from 0.01 to 0.08 $g/cm^3$, from 0.02 to 0.06 $g/cm^3$, from 0.01 to 1 grams per cubic centimeter ($g/cm^3$), from 0.01 to 0.5 $g/cm^3$, from 0.01 to 0.2 $g/cm^3$, from 0.01 to 0.1 $g/cm^3$, from 0.01 to 0.05 $g/cm^3$, from 0.01 to 0.02 $g/cm^3$, from 0.02 to 1 $g/cm^3$, from 0.02 to 0.5 $g/cm^3$, from 0.02 to 0.2 $g/cm^3$, from 0.02 to 0.1 $g/cm^3$, from 0.02 to 0.05 $g/cm^3$, from 0.05 to 1 $g/cm^3$, from 0.05 to 0.5 $g/cm^3$, from 0.05 to 0.2 $g/cm^3$, from 0.05 to 0.1 $g/cm^3$, from 0.06 to 0.08 $g/cm^3$, from 0.1 to 1 $g/cm^3$, 0.1 to 0.5 $g/cm^3$, from 0.1 to 0.2 $g/cm^3$, from 0.2 to 1 $g/cm^3$, from 0.2 to 0.5 $g/cm^3$, or from 0.5 to 1 $g/cm^3$.

As stated previously, the carbon nanotubes are capable of conducting electric energy. The carbon nanotubes may have a conductivity of from 0.01 to 20 ohm meters ($\Omega \cdot m$), 0.01 to 10$\Omega \cdot m$, 0.01 to 5$\Omega \cdot m$, 0.01 to 2$\Omega \cdot m$, 0.01 to 1$\Omega \cdot m$, 1 to 20$\Omega \cdot m$, 1 to 10$\Omega \cdot m$, 1 to 5$\Omega \cdot m$, 1 to 2$\Omega \cdot m$, 2 to 20$\Omega \cdot m$, 2 to 10$\Omega \cdot m$, 2 to 5$\Omega \cdot m$, 5 to 20$\Omega \cdot m$, 5 to 10$\Omega \cdot m$, or 10 to 20$\Omega \cdot m$. addition.

The fluid may include at least one of a drilling fluid, a spacer fluid, or a cement slurry. In some embodiments, the fluid includes an aqueous solution. The cement slurry includes cement precursor material and water. The cement precursor material may be any suitable material which, when mixed with water, can be cured into a cement. The cement precursor material may be a hydraulic or a non-hydraulic cement precursor. A hydraulic cement precursor material refers to a mixture of limestone, clay and gypsum burned together under extreme temperatures that may begin to harden instantly or within a few minutes while in contact with water. A non-hydraulic cement precursor material refers to a mixture of lime, gypsum, plasters and oxychloride. A non-hydraulic cement precursor may take longer to harden or may require drying conditions for proper strengthening. A hydraulic or non-hydraulic cement precursor material may be chosen based on the desired application of the cement slurry of the present disclosure. In some embodiments, the cement precursor material may be Portland cement precursor, for example, Class G Portland Cement. Portland cement precursor is a hydraulic cement precursor (cement precursor material that not only hardens by reacting with water but also forms a water-resistant product) produced by pulverizing clinkers, which contain hydraulic calcium silicates and one or more of the forms of calcium sulfate as an inter-ground addition.

The cement precursor material may include one or more of calcium hydroxide, silicates, oxides, belite ($Ca_2SiO_5$), alite ($Ca_3SiO_4$), tricalcium aluminate ($Ca_3Al_2O_6$), tetracalcium aluminoferrite ($Ca_4Al_2Fe_2O_{10}$), brownmilleriate (4CaO $Al_2O_3 \cdot Fe_2O_3$), gypsum ($CaSO_4 \cdot 2H_2O$) sodium oxide, potassium oxide, limestone, lime (calcium oxide), hexavalent chromium, trivalent chromium, calcium aluminate, silica sand, silica flour, hematite, manganese tetroxide, other similar compounds, and combinations of these. The cement precursor material may include Portland cement, siliceous fly ash, calcareous fly ash, slag cement, silica fume, quartz, any known cement precursor material or combinations of any of these. Silica flour is a finely ground crystalline silica with a molecular formula of $SiO_2$ and with a grain size ranging from 1 to 500 microns, from 10 to 500 microns, from 10 to 100 microns, from 10 to 80 microns, from 10 to 50 microns, from 10 to 20 microns, from 20 to 100 microns, from 20 to 80 microns, from 20 to 50 microns, from 50 to 100 microns, from 50 to 80 microns, or from 80 to 100 microns.

Water may be added to the cement precursor material to produce the slurry. The water may be distilled water, deionized water, or tap water. In some embodiments, the water may contain additives or contaminants. For instance, the water may include freshwater or seawater, natural or synthetic brine, or salt water. In some embodiments, salt or other organic compounds may be incorporated into the water to control certain properties of the water, and thus the cement slurry, such as density. Without being bound by any particular theory, increasing the saturation of water by increasing the salt concentration or the level of other organic compounds in the water may increase the density of the water, and thus, the cement slurry. Suitable salts may include, but are not limited to, alkali metal chlorides, hydroxides, or carboxylates. In some embodiments, suitable salts may include sodium, calcium, cesium, zinc, aluminum, magnesium, potassium, strontium, silicon, lithium, chlorides, bromides, carbonates, iodides, chlorates, bromates, formates, nitrates, sulfates, phosphates, oxides, fluorides, and combinations of these.

In some embodiments, the cement slurry may contain from 10 wt. % to 70 wt. % by weight of cement precursor (BWOC) water. In some embodiments, the cement slurry may contain from 10 wt. % to 40 wt. %, from 10 wt. % to 30 wt. %, from 10 wt. % to 20 wt. %, from 20 wt. % to 40 wt. %, from 25 wt. % to 35 wt. %, or from 20 wt. % to 30 wt. % BWOC water. The cement slurry may contain 30 wt. % BWOC water.

The cement slurry may have a density of from 10 to 20 pounds per gallon (ppg), from 10 to 17 ppg, from 10 to 16 ppg, from 10 to 15 ppg, from 12 to 20 ppg, from 12 to 17 ppg, from 12 to 16 ppg, from 12 to 15 ppg, from 14 to 20 ppg, from 14 to 17 ppg, from 14 to 16 ppg, from 14 to 15 ppg, from 15 to 20 ppg, from 15 to 17 ppg, from 15 to 16 ppg, or of 15 ppg.

In some embodiments, the cement slurry may contain at least one or more additives. The one or more additives may be any additives known to be suitable for cement slurries. As non-limiting examples, suitable additives may include accelerators, retarders, extenders, suspending agents, weighting agents, fluid loss control agents, lost circulation control agents, surfactants, antifoaming agents, and combinations of these.

In some embodiments, the cement slurry may contain from 0.1% to 10% BWOC of the one or more additives based on the total weight of the cement slurry. For instance, the cement slurry may contain from 0.1% to 8% BWOC of the one or more additives, from 0.1% to 5% BWOC of the one or more additives, or from 0.1% to 3% BWOC of the one or more additives. The cement slurry may contain from 1% to 10% BWOC of the one or more additives, from 1% to 8% BWOC, from 1% to 5% BWOC, or from 1% to 3% BWOC of the one or more additives. In some embodiments, the cement slurry may contain from 3% to 5% BWOC, from 3% to 8% BWOC, from 3% to 10% BWOC, or from 5% to 10% BWOC of the one or more additives.

As stated previously, the fluid may include a drilling fluid. The drilling fluid may include an aqueous phase. The aqueous phase may include at least one of fresh water, salt water, brine, municipal water, subsurface formation water, produced water, well water, filtered water, distilled water, sea water, or combinations thereof. The brine may include at least one of natural and synthetic brine, such as saturated brine or formate brine. The aqueous phase may use water containing organic compounds or salt. Without being bound by any particular theory, salt or other organic compounds may be incorporated into the aqueous phase to control the density of the drilling fluid. Increasing the saturation of the aqueous phase by increasing the salt concentration or the level of other organic compounds in the aqueous phase may increase the density of the drilling fluid. Suitable salts include but are not limited to alkali metal chlorides, hydroxides, or carboxylates. In some embodiments, suitable salts may include sodium, calcium, cesium, zinc, aluminum, magnesium, potassium, strontium, silicon, lithium, chlorides, bromides, carbonates, iodides, chlorates, bromates, formates, nitrates, sulfates, phosphates, oxides, fluorides and combinations of these. In some particular embodiments, brine may be used in the aqueous phase. Without being bound by any particular theory, brine may be used to create osmotic balance between the drilling fluid and the subterranean subsurface formation 140.

In some embodiments, the drilling fluid may contain from 10 weight percent (wt. %) to 70 wt. % of the aqueous phase based on the total weight of the drilling fluid. In some embodiments, the drilling fluid may contain from 28 pounds per barrel (lb/bbl) to 630 lbs/bbl, such as from 30 to 600 lbs/bbl, from 50 to 500 lbs/bbl, from 100 to 500 lb/bbl, 200 to 500 lbs/bbl, or 300 to 600 lbs/bbl of the aqueous phase.

The drilling fluid may be nonaqueous. In some embodiments, the drilling fluid may include an oleaginous phase, which may include natural or synthetic liquid oil. Specifically, the drilling fluid may include diesel oil, mineral oil, hydrogenated or unhydrogenated olefins such as poly-alpha olefins, linear and branched olefins, poly-diorganosiloxanes, siloxanes, organosiloxanes, esters of fatty acids, straight chain, branched or cyclical alkyl ethers of fatty acids, esters, ethers, acetals, dialkylcarbonates, hydrocarbons or combinations of any of these. In some embodiments, the drilling fluid may include oils derived from petroleum, such as mineral oils, diesel oils, linear olefins, paraffin, other petroleum-based oils, and combinations of these oils or oils derived from plants, such as safra oil, for example.

The drilling fluid may contain from 10 wt. % to 90 wt. % of the oleaginous phase based on the total weight of the drilling fluid. The drilling fluid may contain from 28 lb/bbl to 810 lb/bbl of the oleaginous phase based on the total weight of the drilling fluid, such as from 30 to 800 lb/bbl, from 50 to 800 lb/bbl, from 75 to 800 lb/bbl, or from 100 to 800 lb/bbl. In some embodiments, the drilling fluid may contain from 200 to 800 lb/bbl, or 300 to 600 lb/bbl, or 500 to 810 lb/bbl of the oleaginous phase.

The drilling fluid may include a polar aprotic solvent. In some embodiments, the polar aprotic solvent may replace the aqueous phase of the drilling fluid. A polar aprotic solvent polar lacks an acidic hydrogen, and therefore is not a hydrogen bond donor, meaning that it cannot donate a hydrogen. Polar aprotic solvents may dissolve salts and may be capable of accepting hydrogen bonds. Polar aprotic solvents may have a dielectric constant, or relative permittivity, of greater than 10, 15, 20, 25, 30, 35, or 40. Polar aprotic solvents may also have a dipole moment of greater than 1 debye (1 debye=$1\times10^{-18}$ statcoulomb-centimeter), 2 debyes, 3 debyes, 3.5 debyes, 4 debyes, 4.5 debyes, or 5 debyes. The polar aprotic solvent may include at least one of n-alkyl pyrrolidone, dimethylformamide, dimethylsulfonide, acetonitrile, dimethylformamide, hexamethylphosphoramide, or dimethyl sulfoxide.

The drilling fluid may include at least one surfactant. The surfactant may maintain the dispersion of the carbon nanotubes within the drilling fluid. The surfactant may be anionic, cationic, or neutral. Nonlimiting examples of anionic surfactants include sulfonated polymers, sulfonated alkanes, polycarboxylated ethers, or combinations thereof. Nonlimiting examples of cationic surfactants include trimethylalkylammonium salts, alkylbenxylammonium salts, or combinations thereof. Nonlimiting examples of neutral surfactants include proteins, polyethylene glycol derivatives, oligosaccharides, cholesterol derivatives, or combinations thereof. The surfactant may include at least one of sulfonated polymers, sulfonated alkanes, polycarboxylated ethers, trimethylalkylammonium salts, alkylbenzylammonium salts, proteins, polyethylene glycol derivatives, oligosaccharides, or cholesterol derivatives. The drilling fluid may contain from 0.01 wt. % to 20 wt. % of the surfactant based on the total weight of the drilling fluid. The drilling fluid may contain from 0.02 lb/bbl to 180 lb/bbl of the surfactant based on the total weight of the drilling fluid, such as from 0.02 to 150 lb/bbl, or from 0.05 to 150 lb/bbl. In some embodiments, the drilling fluid may contain from 0.1 to 150 lb/bbl, or from 0.1 to 100 lb/bbl, or from 1 to 100 lb/bbl of the surfactant.

In some embodiments, the drilling fluid may contain at least one additive other than the surfactant. The one or more additives may be any additives known to be suitable for drilling fluids. As non-limiting examples, suitable additives may include fluid loss control agents, lost circulation control agents, filtration control additives, antifoaming agents, emulsifiers, weighting agent, fluid loss additives, an alkali reserve, specialty additives, and combinations of these.

In some embodiments, the one or more additives may include an additional viscosifier, also referred to as a rheology modifier, which may be added to the drilling fluid to impart non-Newtonian fluid rheology to the drilling fluid to facilitate lifting and conveying rock cuttings to the surface of the wellbore. Examples of viscosifiers may include, but are not limited to bentonite, polyacrylamide, polyanionic cellulose, or combinations of these viscosifiers. In some embodiments, the drilling fluid may include xanthan gum, a polysaccharide commonly referred to XC polymer. The XC polymer may be added to the water-based drilling fluid to produce a flat velocity profile of the water-based drilling fluid in annular flow, which may help to improve the efficiency of the drilling fluid in lifting and conveying rock cuttings to the surface.

In some embodiments, the drilling fluid may contain from 0.01 wt. % to 20 wt. % of the one or more additives based on the total weight of the drilling fluid. The drilling fluid may contain from 0.02 lb/bbl to 180 lb/bbl of the one or more additives based on the total weight of the drilling fluid, such as from 0.02 to 150 lb/bbl, or from 0.05 to 150 lb/bbl. In some embodiments, the drilling fluid may contain from 0.1 to 150 lb/bbl, or from 0.1 to 100 lb/bbl, or from 1 to 100 lb/bbl of the one or more additives.

In another embodiment, the method includes mixing insulating materials into a drilling fluid, mixing conductive materials into a spacer fluid, introducing the drilling fluid into the well, and allowing the insulating materials to coat a surface of a subsurface formation, thereby forming an electrically insulating layer. The method further includes introducing the spacer fluid into the well, allowing the conductive materials to coat the electrically insulating layer, thereby forming an electrically conductive data conduit coating, and transmitting data through the electrically conductive data conduit coating to determine the integrity of the well.

The insulating materials may include silica. In some embodiments, the insulating materials include colloidal silica. The insulating materials may be amine functionalized.

This means that the insulating materials may include amine functionalized silica or amine functionalized colloidal silica, or both.

The method may further include cementing the wellbore after allowing the conductive materials to coat the electrically insulating layer. The electrically insulating layer may have a relative static permittivity of from 2 to 25.

The layering of the electrically conductive data conduit coating or the electrically insulating layer on the surface of the subsurface formation may be achieved through physisorption or chemisorption to the surface of the subsurface formation. In some embodiments, the electrically conductive data conduit coating may adsorb onto the electrically insulating layer to make a second layer which is electrically conductive. In some embodiments, a drilling fluid including dispersed conductive fibers is used to drill a wellbore. The hydrostatic pressure of this drilling fluid may be great enough to allow for the formation of filter cake on the surface of the subsurface formations surrounding the wellbore. In such embodiments, the layering of the electrically conductive data conduit coating or the electrically insulating layer on the surface of the subsurface formation may be achieved through physisorption or chemisorption to the filter cake.

In some applications, the method includes conducting an electric current through the electrically conductive data conduit coating from a power source to sensors embedded throughout the wellbore, and then conducting an electric current through the electrically conductive data conduit coating from the sensors to a computing device. This electrically conductive data conduit coating allows for information transmission, or telemetry, throughout the wellbore.

Referring now to FIGS. 2 to 5, which illustrate detailed alternative embodiments of the wellbore 10 at inset A shown in FIG. 1, the plurality of wellbore sensors 150 for monitoring wellbore integrity, in real-time, intermittently, or both, may be disposed in any of the previously-discussed coatings. FIG. 1 shows an embodiment of a wellbore integrity monitoring configuration 100. The wellbore integrity monitoring configuration 100 has an electrically conductive data conduit coating 130 disposed between a wellbore casing 160 and a subsurface formation 140, a plurality of wellbore sensors 150, and a surface interrogator in communication with the wellbore sensors 150 via the electrically conductive data conduit coating 130. The electrically conductive data conduit coating 130 provides a medium for data transmission from the wellbore sensors 150 to the surface interrogator. The wellbore sensors 150 are disposed in the subsurface formation 140, the electrically conductive data conduit coating 130 or in an intervening layer disposed between the electrically conductive data conduit coating 130 and the wellbore casing 160. The wellbore sensors 150 are operable to measure a condition that is indicative of the integrity of the wellbore 10 and to generate sensory data representing the wellbore 10 condition. The surface interrogator, the wellbore sensors 150, and the electrically conductive data conduit coating 130 are collectively configured for the transfer of sensory data from the wellbore sensors 150 to the surface interrogator via the electrically conductive data conduit coating 130 to facilitate monitoring of the integrity of the wellbore 10 based on sensory data received from the wellbore sensors 150.

The wellbore sensors 150 may be embedded in various locations throughout the wellbore. Referring to FIG. 2, these wellbore sensors 150 may be disposed throughout the electrically conductive data conduit coating 130. In another embodiment, shown in FIG. 3, the wellbore sensors 150 may be disposed throughout the electrically insulating layer 120. FIG. 4 illustrates that the wellbore sensors 150 may be disposed throughout the subsurface formation 140. Referring to FIG. 5, the wellbore sensors 150 may be disposed throughout the cement layer 110. Referring again to the embodiments shown in FIGS. 2 to 5 as a whole, these wellbore sensors 150 may assist in propagating data along the direction of the wellbore 10 towards the surface.

In some embodiments, the wellbore sensors 150 may be disposed in more than one coating. These wellbore sensors 150 measure and transmit information related to downhole parameters and conditions. The wellbore sensors 150 may include pressure sensors, temperature sensors, piezoelectric acoustic sensors, flowmeters for determining flow rate, accelerometers, resistivity sensors for determining water content, velocity sensors, weight sensors or any other type of sensor that measures a fluid property or physical parameter of downhole. The wellbore sensors 150 may be used for creating an electromagnetic profile of the wellbore by measuring variations in the electromagnetic properties of the wellbore such as impedance, resistance, inductance or capacitance.

The wellbore sensors 150 may be battery powered, or inductively powered either directly or through a rechargeable battery. Some wellbore sensors 150 may only transmit signals related to the data collected and others may be operable to transmit as well as receive signals. Some wellbore sensors 150 are able to communicate with the surface equipment as well as with other sensors. The wellbore sensors 150 may have a receiver/transmitter that is used to transmit data and receive instructions between wellbore sensors 150 and the surface, or between the wellbore sensors 150 and another downhole system. The wellbore sensors 150 may have a microprocessor associated to allow for manipulation and interpretation of data and for processing received instructions. Likewise, the wellbore sensors 150 may be coupled to memory device that provides for storing information for later batch processing or batch transmission.

In some embodiments, transmitting data through the electrically conductive data conduit coating further includes transmitting data to a surface of the well. This data may then be interpreted to determine the integrity of the wellbore. This may include the location of any fractures that may cause unwanted fluid communication between the wellbore and subsurface formations, or the location of weak spots within the wellbore that form over time.

Referring again to FIG. 1, in some embodiments, the electrically conductive data conduit coating 130 may be connected to the surface interrogator comprising a receiver/transmitter (X/R) 220, a power supply (P) 230, data storage (D) 240, and a microprocessor (MP) 250. The wellbore sensors 150 may communicate with the surface interrogator via the electrically conductive data conduit coating 130. Suitable frequencies, frequency band ranges with signal-to-noise ratio(s) of greater than 2 may be used in response to local conditions to maximize the transmission distance and signal strength. Some wellbore sensors 150 may be inductively operable for one/two-way communication or be wirelessly powered. The wellbore sensors 150 may communicate with or be powered by the surface interrogator via the electrically conductive data conduit coating 130 using other suitable methods and techniques. In one embodiment, the wellbore sensors 150 and the surface interrogator may communicate using a wireless downhole electromagnetic data transmission system (not shown). The method may further utilize microprocessor based controlled frequency synthesis for two-way communication between the surface interrogator and the wellbore sensors 150. The electrically conductive data conduit coating 130 may become a conductor onto which the sensory data gathered by the wellbore sensors 150 is encoded in a digital format. The sensory data may be impressed upon the electrically conductive data conduit coating 130 using frequency shift keying of the electromagnetic energy waves. The sensory data may be analyzed by the surface interrogator in a variety of ways, the details of which are beyond the scope of the present disclosure but include, for example, data processing, filtering, demodulation, storage and display at the surface.

In one embodiment, the electrically conductive data conduit coating 130 is used as a communications channel using, for example, Orthogonal Frequency Division Multiplexing (OFDM) coupled with Wideband Frequency Division Multiple Access (W-CDMA). This system may be adapted to changing channel conditions as well as can accommodate multiple downhole sensors 150.

In some embodiments, prior to formation of the intervening layer, which may comprise the cement layer 110, the electrically insulating layer 120, or both, the wellbore casing 160 will be positioned in the wellbore 10 with a gap between the wellbore casing 160 and the subsurface formation 140, or other layers formed on the subsurface formation 140. A wellbore casing centralizer can be disposed in this gap to properly position the wellbore casing 160 in the wellbore 10 and provide a continuous 360 degree annular space around the wellbore casing 160. This annular space allows cement forming the cement layer 110 to completely seal the wellbore casing 160 within the wellbore 10. Although the concepts of the present disclosure are not limited to specific types of wellbore casing centralizers, and contemplate the use of conventional or yet-to-be developed centralizers, it is noted that there are generally two distinct classes of centralizers—bow-spring designs and a rigid blade designs. Regardless of the type of wellbore casing centralizer used, the present disclosure contemplates the securement of wellbore sensors 150 to the wellbore casing centralizer or the integration of wellbore sensors 150 in the structure of the wellbore casing centralizer.

The following description of the embodiments is illustrative in nature and is in no way intended to be limiting it its application or use. As used throughout this disclosure, the singular forms "a," "an" and "the" include plural referents unless the context clearly dictates otherwise. Thus, for example, reference to "a" component includes aspects having two or more such components, unless the context clearly indicates otherwise.

The presently described subject matter may include one or more aspects, which should not be regarded as limiting on the teachings of the present disclosure. A first aspect may include a method of determining integrity of a well comprising: mixing conductive materials into a fluid; introducing the fluid into the well; allowing the conductive materials to coat a surface of a subsurface formation, thereby forming an electrically conductive data conduit coating; and transmitting data through the electrically conductive data conduit coating to determine the integrity of the well.

A second method may include a method of determining integrity of a well comprising: mixing insulating materials into a drilling fluid, in which the insulating materials comprise silica, colloidal silica, amine functionalized silica, amine functionalized colloidal silica or combinations thereof; mixing conductive materials into a spacer fluid, in which the conductive materials comprise carbon nanotubes selected from single-walled nanotubes, double-walled nanotubes, multi-walled carbon nanotubes, narrow-walled nanotubes, or combinations thereof; introducing the drilling fluid into the well; allowing the insulating materials to coat a surface of a subsurface formation, thereby forming an electrically insulating layer; introducing the spacer fluid into the well; allowing the conductive materials to coat the electrically insulating layer, thereby forming an electrically conductive data conduit coating; introducing a cement slurry into the well; cementing the well; and transmitting data through the electrically conductive data conduit coating to a surface of the well to determine the integrity of the well.

A third method may include wellbore integrity monitoring configuration comprising: an electrically conductive data conduit coating disposed between a wellbore casing and a subsurface formation, a plurality of wellbore sensors, and a surface interrogator in communication with the wellbore sensors via the electrically conductive data conduit coating, in which: the electrically conductive data conduit coating provides a medium for data transmission from the wellbore sensors to the surface interrogator; the wellbore sensors are disposed in the subsurface formation, the electrically conductive data conduit coating or in an intervening layer disposed between the electrically conductive data conduit coating and the wellbore casing; the wellbore sensors are operable to measure a condition that is indicative of the integrity of the wellbore and to generate sensory data representing the wellbore condition; and the surface interrogator, the wellbore sensors, and the electrically conductive data conduit coating are collectively configured for the transfer of sensory data from the wellbore sensors to the surface interrogator via the electrically conductive data conduit coating to facilitate monitoring of the integrity of the wellbore based on sensory data received from the wellbore sensors.

Another aspect includes any of the previous aspects, in which transmitting data through the electrically conductive data conduit coating further comprises transmitting data to a surface of the well.

Another aspect includes any of the previous aspects, in which the fluid comprises an aqueous solution.

Another aspect includes any of the previous aspects, in which the fluid comprises at least one of a drilling fluid, a spacer fluid, or a cement slurry.

Another aspect includes any of the previous aspects, in which the conductive materials comprise at least one of carbon fibers, carbon nanofibers, carbon nanotubes, carbon nanosheets, or graphene.

Another aspect includes any of the previous aspects, in which the conductive materials comprise carbon nanotubes selected from single-walled nanotubes, double-walled nanotubes, multi-walled carbon nanotubes, narrow-walled nanotubes, or combinations thereof.

Another aspect includes any of the previous aspects, further comprising cementing the well after allowing the conductive materials to coat the surface of the subsurface formation.

Another aspect includes any of the previous aspects, further comprising cementing the well after allowing the conductive materials to coat the electrically insulating layer.

Another aspect includes any of the previous aspects, in which the insulating materials comprise silica, colloidal silica, amine functionalized silica, amine functionalized colloidal silica or combinations thereof.

Another aspect includes any of the previous aspects, in which the electrically insulating layer has a relative static permittivity of from 2 to 25.

Another aspect includes any of the previous aspects, in which the drilling fluid comprises at least one of natural oil, synthetic oil, diesel oil, mineral oil, hydrogenated olefins, and unhydrogenated olefins.

Another aspect includes any of the previous aspects, in which the drilling fluid comprises at least one of accelerators, retarders, extenders, weighting agents, fluid loss control agents, lost circulation control agents, surfactants, and antifoaming agents.

Another aspect includes any of the previous aspects, in which the wellbore sensors are disposed in the electrically conductive data conduit coating.

Another aspect includes any of the previous aspects, in which the wellbore sensors are disposed in the subsurface formation.

Another aspect includes any of the previous aspects, in which: the intervening layer comprises a cement layer disposed between the wellbore casing and the electrically conductive data conduit coating; and the wellbore sensors are disposed in the cement layer.

Another aspect includes any of the previous aspects, in which: the intervening layer comprises an electrically insulating layer disposed between the wellbore casing and the electrically conductive data conduit coating; and the wellbore sensors are disposed in the electrically insulating layer.

Another aspect includes any of the previous aspects, in which the wellbore sensors are disposed in at least two of the electrically conductive data conduit coating, the subsurface formation, and the intervening layer.

Another aspect includes any of the previous aspects, in which: the intervening layer comprises a cement layer and an electrically insulating layer disposed between the wellbore casing and the electrically conductive data conduit coating; and the wellbore sensors are disposed in at least two of the electrically conductive data conduit coating, the subsurface formation, the cement layer, and the electrically insulating layer.

Another aspect includes any of the previous aspects, in which the wellbore sensors comprise pressure sensors, temperature sensors, piezoelectric acoustic sensors, flowmeters for determining flow rate, accelerometers, resistivity sensors for determining water content, velocity sensors, weight sensors, or combinations thereof.

Another aspect includes any of the previous aspects, in which the electrically conductive data conduit coating comprises carbon fibers, carbon nanofibers, carbon nanotubes, carbon nanosheets, graphene, or combinations thereof.

Another aspect includes any of the previous aspects, in which the electrically conductive data conduit coating comprises conductive fibers.

Another aspect includes any of the previous aspects, in which the electrically conductive data conduit coating has a conductivity in a range from about 0.01 ohm meters ($\Omega$m) to about 20 $\Omega$m.

Another aspect includes any of the previous aspects, in which the electrically conductive data conduit coating has a conductivity in a range from about 0.01 $\Omega$m to about 1 $\Omega$m.

Another aspect includes any of the previous aspects, in which: the intervening layer disposed between the electrically conductive data conduit coating and the wellbore casing comprises a wellbore casing centralizer; and the wellbore sensors are secured to or integrated with the wellbore casing centralizer.

It should be apparent to those skilled in the art that various modifications and variations may be made to the embodiments described within without departing from the spirit and scope of the claimed subject matter. Thus, it is intended that the specification cover the modifications and variations of the various embodiments described within provided such modification and variations come within the scope of the appended claims and their equivalents.

It is noted that one or more of the following claims utilize the term "where" or "in which" as a transitional phrase. For the purposes of defining the present technology, it is noted that this term is introduced in the claims as an open-ended transitional phrase that is used to introduce a recitation of a series of characteristics of the structure and should be interpreted in like manner as the more commonly used open-ended preamble term "comprising." For the purposes of defining the present technology, the transitional phrase "consisting of" may be introduced in the claims as a closed preamble term limiting the scope of the claims to the recited components or steps and any naturally occurring impurities. For the purposes of defining the present technology, the transitional phrase "consisting essentially of" may be introduced in the claims to limit the scope of one or more claims to the recited elements, components, materials, or method steps as well as any non-recited elements, components, materials, or method steps that do not materially affect the characteristics of the claimed subject matter. The transitional phrases "consisting of" and "consisting essentially of" may be interpreted to be subsets of the open-ended transitional phrases, such as "comprising" and "including," such that any use of an open ended phrase to introduce a recitation of a series of elements, components, materials, or steps should be interpreted to also disclose recitation of the series of elements, components, materials, or steps using the closed terms "consisting of" and "consisting essentially of" For example, the recitation of a composition "comprising" components A, B, and C should be interpreted as also disclosing a composition "consisting of" components A, B, and C as well as a composition "consisting essentially of" components A, B, and C. Any quantitative value expressed in the present application may be considered to include open-ended embodiments consistent with the transitional phrases "comprising" or "including" as well as closed or partially closed embodiments consistent with the transitional phrases "consisting of" and "consisting essentially of."

Having described the subject matter of the present disclosure in detail and by reference to specific embodiments of any of these, it is noted that the various details disclosed within should not be taken to imply that these details relate to elements that are essential components of the various embodiments described within, even in cases where a particular element is illustrated in each of the drawings that accompany the present description. Further, it should be apparent that modifications and variations are possible without departing from the scope of the present disclosure, including, but not limited to, embodiments defined in the appended claims. More specifically, although some aspects of the present disclosure are identified as particularly advantageous, it is contemplated that the present disclosure is not necessarily limited to these aspects.

What is claimed is:

1. A wellbore integrity monitoring configuration comprising:
    an electrically insulating layer disposed between the subsurface formation and a wellbore casing,
    an electrically conductive data conduit coating disposed between the wellbore casing and the electrically insulating layer,
    a plurality of wellbore sensors, and a surface interrogator in communication with the wellbore sensors via the electrically conductive data conduit coating, in which:
the electrically conductive data conduit coating provides a medium for data transmission from the wellbore sensors to the surface interrogator;
the wellbore sensors are disposed in the subsurface formation, the electrically conductive data conduit coating or in an intervening layer disposed between the electrically conductive data conduit coating and the wellbore casing;
the wellbore sensors are operable to measure a condition that is indicative of the integrity of the wellbore and to generate sensory data representing the wellbore condition; and
the surface interrogator, the wellbore sensors, and the electrically conductive data conduit coating are collectively configured for the transfer of sensory data from the wellbore sensors to the surface interrogator via the electrically conductive data conduit coating to facilitate monitoring of the integrity of the wellbore based on sensory data received from the wellbore sensors.

2. The wellbore integrity monitoring configuration of claim 1, in which the wellbore sensors are disposed in the electrically conductive data conduit coating.

3. The wellbore integrity monitoring configuration of claim 1, in which the wellbore sensors are disposed in the subsurface formation.

4. The wellbore integrity monitoring configuration of claim 1, in which:
the intervening layer comprises a cement layer disposed between the wellbore casing and the electrically conductive data conduit coating; and
the wellbore sensors are disposed in the cement layer.

5. The wellbore integrity monitoring configuration of claim 1, in which the wellbore sensors are disposed in the electrically insulating layer.

6. The wellbore integrity monitoring configuration of claim 1, in which:
the intervening layer comprises a cement layer disposed between the wellbore casing and the electrically conductive data conduit coating; and
the wellbore sensors are disposed in at least two of the electrically conductive data conduit coating, the subsurface formation, the cement layer, and the electrically insulating layer.

7. The wellbore integrity monitoring configuration of claim 1, in which the wellbore sensors comprise pressure sensors, temperature sensors, piezoelectric acoustic sensors, flowmeters for determining flow rate, accelerometers, resistivity sensors for determining water content, velocity sensors, weight sensors, or combinations thereof.

8. The wellbore integrity monitoring configuration of claim 1, in which the electrically conductive data conduit coating comprises carbon fibers, carbon nanofibers, carbon nanotubes, carbon nanosheets, graphene, or combinations thereof.

9. The wellbore integrity monitoring configuration of claim 1, in which the electrically conductive data conduit coating comprises conductive fibers and the electrically conductive data conduit coating has a conductivity in a range from about 0.01 ohm meters ($\Omega$m) to about 20 $\Omega$m.

10. The wellbore integrity monitoring configuration of claim 1, in which:

the intervening layer disposed between the electrically conductive data conduit coating and the wellbore casing comprises a wellbore casing centralizer; and
the wellbore sensors are secured to or integrated with the wellbore casing centralizer.

11. A wellbore integrity monitoring configuration comprising:
an electrically insulating layer disposed between the subsurface formation and a wellbore casing,
an electrically conductive data conduit coating disposed between the wellbore casing and the electrically insulating layer,
a plurality of wellbore sensors, and
a surface interrogator in communication with the wellbore sensors via the electrically conductive data conduit coating, in which:
the wellbore sensors comprise pressure sensors, temperature sensors, piezoelectric acoustic sensors, flowmeters for determining flow rate, accelerometers, resistivity sensors for determining water content, velocity sensors, weight sensors, or combinations thereof;
the electrically conductive data conduit coating provides a medium for data transmission from the wellbore sensors to the surface interrogator;
the electrically conductive data conduit coating comprises carbon fibers, carbon nanofibers, carbon nanotubes, carbon nanosheets, graphene, or combinations thereof;
the electrically conductive data conduit coating has a conductivity in a range from about 0.01 ohm meters ($\Omega$m) to about 20 $\Omega$m;
the wellbore sensors are disposed in the subsurface formation, the electrically conductive data conduit coating or in an intervening layer disposed between the electrically conductive data conduit coating and the wellbore casing;
the wellbore sensors are operable to measure a condition that is indicative of the integrity of the wellbore and to generate sensory data representing the wellbore condition; and
the surface interrogator, the wellbore sensors, and the electrically conductive data conduit coating are collectively configured for the transfer of sensory data from the wellbore sensors to the surface interrogator via the electrically conductive data conduit coating to facilitate monitoring of the integrity of the wellbore based on sensory data received from the wellbore sensors.

12. The wellbore integrity monitoring configuration of claim 11, in which the wellbore sensors are disposed in the electrically conductive data conduit coating.

13. The wellbore integrity monitoring configuration of claim 11, in which the wellbore sensors are disposed in the subsurface formation.

14. The wellbore integrity monitoring configuration of claim 11, in which:
the intervening layer comprises a cement layer disposed between the wellbore casing and the electrically conductive data conduit coating; and
the wellbore sensors are disposed in the cement layer.

15. The wellbore integrity monitoring configuration of claim 11, in which the wellbore sensors are disposed in the electrically insulating layer.

16. The wellbore integrity monitoring configuration of claim 11, in which:

the intervening layer comprises a cement layer disposed between the wellbore casing and the electrically conductive data conduit coating; and the wellbore sensors are disposed in at least two of the electrically conductive data conduit coating, the subsurface formation, the cement layer, and the electrically insulating layer.

17. The wellbore integrity monitoring configuration of claim 11, in which the electrically conductive data conduit coating comprises conductive fibers.

18. The wellbore integrity monitoring configuration of claim 11, in which:

the intervening layer disposed between the electrically conductive data conduit coating and the wellbore casing comprises a wellbore casing centralizer; and the wellbore sensors are secured to or integrated with the wellbore casing centralizer.

* * * * *